United States Patent [19]

Hayashi et al.

[11] 3,914,502

[45] Oct. 21, 1975

[54] HEAT-ADHESIVE LAMINATED FILM

[75] Inventors: Ikuya Hayashi; Keiichi Uno; Mikio Matsuoka, all of Otsu, Japan

[73] Assignee: Toyo Boseki Kabushiki Kaisha, Osaka, Japan

[22] Filed: Mar. 27, 1974

[21] Appl. No.: 455,110

Related U.S. Application Data

[63] Continuation-in-part of Ser. No. 435,925, Jan. 23, 1974.

[30] Foreign Application Priority Data

Feb. 2, 1973 Japan.............................. 48-13956

[52] U.S. Cl. ............... 428/336; 428/337; 428/412; 428/458; 428/474; 428/480
[51] Int. Cl.² ................B32B 15/08; B32B 27/36; B32B 27/34; B32B 27/28
[58] Field of Search ........... 161/214, 165, 213, 231, 161/183, 227; 428/336, 337, 412, 458, 428/474, 480

[56] References Cited
UNITED STATES PATENTS

| | | | |
|---|---|---|---|
| 3,372,148 | 3/1968 | Wiener | 156/332 X |
| 3,502,623 | 3/1970 | Hurworth et al. | 117/49 X |
| 3,556,816 | 1/1971 | Nughes | 426/126 |
| 3,795,644 | 3/1974 | Jackson et al. | 161/214 X |
| 3,852,151 | 12/1974 | Knapp | 161/214 X |

*Primary Examiner*—Harold Ansher
*Attorney, Agent, or Firm*—Kaufman & Kramer

[57] ABSTRACT

A heat-adhesive laminated film comprising a base film selected from a film of plastic material having excellent heat resistance such as polyesters, polyamides or polycarbonates and a foil of metal such as aluminum or copper and a film of a resin comprising predominantly block copolyester having a melting point of higher than 180°C but lower than the temperature at which the characteristics of the base film are deteriorated and a Young's modulus $\epsilon$ (dyne/cm²) and a breaking elongation $(\Delta l/l_o) \times 100(\%)$ when measured at 20°C and 130°C being as follows, respectively:

$10^7$ (dyne/cm²) $< \epsilon < 10^{10}$ (dyne/cm²) and
$(\Delta l/l_o) \times 100 > 40$ (%), said film of a resin being laminated on at least single side of the base film.

11 Claims, No Drawings

HEAT-ADHESIVE LAMINATED FILM

This application is a continuation-in-part of copending application Ser. No. 435,925 filed Jan. 23, 1974.

The present invention relates to a heat-adhesive laminated film having excellent heat resistance. More particularly, it relates to a heat-adhesive laminated film having excellent heat resistance which is produced by laminating a film selected from a film of plastic material having excellent heat resistance such as polyesters, polyamides or polycarbonates and a foil of metal such as aluminum or copper with a film of a resin comprising predominantly block copolyester.

There have, heretofore, been used a heat resistant film such as polyester film, polyamide film and polycarbonate film and a metal foil such as aluminum foil and copper foil for various utilities such as food packaging, insulating material, tape or the like in accordance with their excellent mechanical, electrical and chemical properties (e.g. chemical proofing, oil resistance and water proofing), heat resistance and cold proofing. However, they have been scarcely used alone but used usually by laminating partially or wholly with each other or with other plastic film or metal foil. But, such plastic film or metal foil per se has no heat-adhesive property and therefore there have been proposed some methods for giving them heat-adhesive property. Among them the methods for laminating a thermoplastic resin on the surface of the film is a preferable one because it can be adhered by heating under pressure for a short time and it has no problem of pot life. Due to its poor heat resistance of the thermoplastic resin, however, when the thermoplastic resin is laminated, the heat resistance of polyester film, polyamide film or polycarbonate film can not be effectively displayed.

Accordingly, there has been sought a film (laminate) having both of excellent heat resistance and excellent heat adhesion in packaging and electrical fields.

In the field of packaging for medical instruments and foods, the packaged material is usually sterilized by heating at above 100°C, usually at 110 to 120°C. For complete sterilization at above 100°C it is necessary to heat at about 120°C for 15 or more minutes in a retort pouch (pressure vessel for sterilization). Besides, in addition to the sterilization step a further treatment in the retort pouch is required for about same time before and after the sterilization, and therefore it is desirable to shorten the sterilization time for rationalization of the retort treatment and for reducing the cost. The heat sterilization procedure should be carried out at sufficiently high temperature and for enough time for killing the spores of bacteria which have high heat resistance, and the relation between the temperature and the time enough for killing the spores may be shown by "logarithmic rule." That is, the number of killed spores varies logarithmically in accordance with the change of the temperature and the time. Accordingly, when the sterilization temperature is raised, the sterilization time can be largely reduced.

As the conventional film used for sterilization by a retort pouch, there may be a laminated (two layers) film comprising polyethylene film and polyester film, polyamide film or polycarbonate film, and a three layers film having aluminum foil between the two layers of the above laminated film. In these laminated films, the polyester film, polyamide film and polycarbonate film are used for the purpose of supplying mainly the mechanical strength and also heat resistance and cold proofing of the laminate, the metal foil such as aluminum foil is used for the purpose of a barrier layer mainly from oxygen, steam, light, ultraviolet rays and the like, and the polyethylene film is used for the purpose of giving mainly a heat-sealing characteristic to the laminate. A container made from these laminating materials must tolerate the high temperature and high pressure in the retort sterilization step, but it may barely tolerate the conventional retort sterilization temperature: about 120°C as far as the polyethylene film is used for giving a heatsealing characteristic to the laminate. However, for rationalization of the retort treatment, higher sterilization temperature is desirable, and therefore, it is desirable to develop an improved heat adhesive laminate being capable of tolerating higher sterilization temperature, such as 130°C or more.

Besides, as electrical parts, there have been used laminates of a metal foil such as aluminum foil and copper foil with polyester film, polyamide film or polycarbonate film for electrical heating element and printed circuits and the films and foils are required to have heat adhesion and heat resistance properties.

These are explained in detail below. Generally, for giving an excellent heat adhesion property to a film, the heat adhesive resin layer of the film must 1. be liquefied by heating and thereby flowed into every nook and corner of the surface of the subject to be adhered,
2. have a good affinity with the subject to be adhered, have a good thermodynamic wetting, and be subject to the action of the intermolecular forces between the resin and the subject to be adhered,
3. be solidified rapidly,
4. have a small residual stress, and
5. have good flexibility so that any stress concentration does not occur when it is destroyed, and simultaneously have a good cohesive force enough to resist destruction. The property of resistance to destruction is required after the laminated film is adhered or heat-sealed, and the film must satisfy the condition mentioned in the above item (5) at high temperature when it is treated at high temperature. Moreover, the laminated film is generally used at a wide range of temperatures from high temperature through room temperature, and therefore the resin must have good dynamic property to satisfy the condition mentioned in the above item (5) at a wide range of temperature from high temperature such as 130°C or more through low temperature such as room or lower temperature.

Thus, among the above-mentioned conditions (1) to (5), the condition (5), i.e., the dynamic property plays a most important role in giving excellent adhesion strength or heat-seal strength in such a wide range of temperature to the laminated film, and the dynamic property is effected largely by the thermic property of the adhesive resin. That is, it is preferable that the adhesive resin layer have a glass transition point of less than room temperature and also a melting point of more than 130°C as the thermic property, for giving the laminated film excellent adhesion strength or heat-seal strength in a wide range of temperature.

Under the circumstances, the present inventors have studied the condition (5), and it has been found that for obtaining the desired film having excellent adhesion strength or heat-seal strength, the dynamic property of the adhesive resin layer must satisfy the conditions mentioned below. That is, when measured at a crosshead speed of 30 cm/minute, it has a Young's modulus $\epsilon$:

$10^7$ (dyne/cm$^2$) $< \epsilon < 10^{10}$ (dyne/cm$^2$)

and a breaking elongation $(\Delta l/lo) \times 100$ (a rate of elongation to the initial length):

$(\Delta l/lo) \times 100 > 40$ (%)

When the adhesive resin layer has a Young's modulus of $10^{10}$ dyne/cm$^2$ or more, the adhesive resin layer becomes hard and glass-like, and thereby a stress concentration to the surface etc. occurs to give a product having poor adhesion strength or heat-seal strength, and on the other hand, when the adhesive resin layer has a Young's modulus of $10^7$ dyne/cm$^2$ or less, the layer becomes soft and can not keep good cohesive force enough to resist destruction and can not show excellent adhesion strength or heat-seal strength even if the breaking elongation is more than 40%. Besides, when the adhesive resin layer has a breaking elongation of 40% or less, the layer can not have toughness enough to resist destruction and can not have excellent adhesion strength or heat-seal strength either, even if the Young's modulus is in a range of $10^7$ (dyne/cm$^2$) $< \epsilon < 10^{10}$ (dyne/cm$^2$).

Therefore, for obtaining the desired film having excellent adhesion strength or heat-seal strength in the wide range of temperature from low temperature such as less than room temperature through high temperature such as more than 130°C, the adhesive resin layer must satisfy the following conditions at 20°C and 130°C:

$10^7$ (dyne/cm$^2$) $< \epsilon < 10^{10}$ (dyne/cm$^2$)
$(\Delta l/lo) \times 100 > 40$ (%)

It is preferable that the adhesive resin layer shows the Young's modulus and breaking elongation of the above range even at the temperature of above 130°C.

Efforts have been made to develop an excellent adhesive resin having not only the above condition (5) but also the conditions (1) through (4), and there has now been found a heat adhesive laminated film having excellent heat resistance at a temperature from low temperature such as less than room temperature through high temperature such as more than 130°C.

An object of the present invention is to provide a heat adhesive laminated film having superior heat resistance to that of polyethylene, which is produced by laminating a film selected from a film of plastic material having excellent heat resistance such as polyesters, polyamides or polycarbonates and a foil of metal such as aluminum or copper with a film of a resin comprising predominantly block copolyester.

This and other objects of the invention will be apparent from the description hereinafter. According to the present invention, the desired laminated film can be produced by laminating a block copolyester film on a base film comprising a plastic film or a metal foil.

The plastic film used as the base film may be made from a polyester (e.g. polyethylene terephthalate, poly-(ethylene terephthalate/ethylene isophthalate), polytetramethylene terephthalate, or polyethylene-1,2-diphenoxyethane-4,4'-dicarboxylate), a polyamide (e.g. nylon 6, nylon 66, nylon 6/10, or polyxylylene adipamide), a polycarbonate (e.g. 4,4'-dihydroxydiphenyl-2,2-propane, i.e., bisphenol A), a copolymer comprising predominantly the monomers of the above polymer, or a mixture of these polymers or copolymers with other polymer having similarly excellent or superior heat resistance to that of the above polymer or copolymer. The plastic film may be any of nonoriented film, uniaxially oriented film, or biaxially oriented film, but the biaxially oriented film is particularly preferred. These films may include other additives such as an antistatic agent, a lubricant, a haze preventing agent, a plasticizer, a stabilizer, an antiblocking agent, a colorant or the like. As the metal foil there may be a foil made from a metal such as aluminum or copper. The base film used in the present invention has preferably a melting point of 200°C or more.

The block copolyester to be laminated on the base film comprises a crystalline polyester segment having a high melting point and a polymer segment having a low melting point and a molecular weight of 400 or more. That is, the block copolyester has a melting point of higher than 180°C but lower than the temperature at which the characteristics of the base film are deteriorated, and further has such dynamic properties (when it is distorted at 20°C and 130°C at a crosshead speed of 30 cm/minute) as a Young's modulus $\epsilon$ (dyne/cm$^2$) and a breaking elongation $(\Delta l/lo) \times 100$ (%) as follows, respectively:

$10^7$ (dyne/cm$^2$) $< \epsilon < 10^{10}$ (dyne/cm$^2$) and
$(\Delta l/lo) \times 100 > 40$ (%)

The temperature at which the characteristics of the base film are deteriorated means a temperature at which the dynamic properties of the base film are deteriorated, when the base film comprises a polymer having excellent heat resistance such as polyesters, polyamides or polycarbonates, and the temperature may be usually about 20°C lower than the melting point of the polymer (base film). When the base film comprises a metal foil, it means about 300°C, since the characteristics of metal foil are changed at higher temperature.

The component of the crystalline polyester segment having a high melting point may be a polyester having a melting point of 200°C or more when a polymer having fiber-forming properties is produced by the component alone. The example of the crystalline polyester segment may be one comprising an aromatic polyester having a bond at para position, such as ethylene terephthalate unit, tetramethylene terephthalate unit or the like as the main component. The preferred one comprises 70 or more % by weight of ethylene terephthalate unit or tetramethylene terephthalate unit. It may contain partially a dibasic acid component, such as isophthalic acid, adipic acid, sebacic acid, or dodecanoic acid. The crystalline polyester segment having a high melting point has preferably a molecular weight of 400 to 10,000.

The polymer segment having a low melting point may be substantially amorphous in the block copolyester. The examples of the polymer segment having a low melting point may be polyether, aliphatic polyester, polylactone or the like. The polymer segment has usually a molecular weight of 400 to 6,000, preferably 700 to 3,000. The ratio of the polymer segment having a low melting point in the block copolyester may be preferably in a range of 5 to 80% by weight, more preferably 10 to 60% by weight, furthermore preferably 20 to 50% by weight.

The suitable examples of the polymer segment having a low melting point may be polyethylene oxide glycol, polytetramethylene oxide glycol, polyethylene adipate, polyethylene dodecanoate, polyneopentyl adipate, polyneopentyl sebacate, polyneopentyl dodecanoate, poly(ε-caprolactone), polypivalolactone, or the like.

The suitable examples of the block copolyester may be polyethylene terephthalate/polyethylene oxide block copolymer, polytetramethylene terephthalate/polyethylene oxide block copolymer, polyethylene terephthalate/polytetramethylene oxide block copolymer, polytetramethylene terephthalate/polytetramethylene oxide block copolymer, polyethylene terephthalate/poly-ε-caprolactone block copolymer, polytetramethylene terephthalate/poly-ε-caprolactone block copolymer, polyethylene terephthalate/polypivalolactone block copolymer, polyethylene terephthalate/polyethylene adipate block copolymer, polyethylene terephthalate/polyneopentyl sebacate block copolymer, polytetramethylene terephthalate/polyethylene dodecanoate block copolymer, polytetramethylene terephthalate/polyneopentyl dodecanoate block copolymer, polyethylene terephthalate isophthalate/polytetramethylene oxide block copolymer, polytetramethylene terephthalate isophthalate/polytetramethylene oxide block copolymer, or the like.

The present laminated film may be produced by extrusion lamination method, i.e., by melt-extruding the block copolyester and laminating it on the base film, or by dry lamination method, i.e., by applying an adhesive to either the base film or the block copolyester film, drying it and then laminating the other one thereon. When the extrusion lamination method is used, the block copolyester film may be directly extruded and laminated on the base film, or optionally any known adhesive may be applied to the base film and dried before the extrusion and lamination of the block copolyester film. The present laminated film may be also produced by applying a block copolyester solution on the base film by gravure roll coating, reverse-roll coating, rod coating, spray coating or the like and drying to remove the solvent.

The base film and the block copolyester may have various thicknesses. The suitable thickness thereof may be chosen according to the utility of the laminated film and the use condition thereof, but the thickness of the base film may be preferably 10 μ or more, particularly 10 to 500 μ, more particularly 10 to 30 μ and that of the block copolyester film may be preferably 30 μ or more, particularly 30 to 500 μ, more particularly 30 to 100 μ.

In the present laminated film, other plastic film or metal foil may be optionally laminated on outside of the base film or between the base film and the block copolyester film, or any other resin may be optionally coated thereon, or further there may be printed thereon.

The laminated film of the present invention can be heat-sealed without losing the dynamic properties and the beautiful appearance of the plastic film such as polyester film, polyamide film or polycarbonate film and the metal film, and has excellent heat-seal strength in a wide range of temperature from low temperature such as less than room temperature through high temperature such as more than 130°C.

Moreover, the present laminated film has excellent tearing strength, pinhole resistance, impact strength, wear resistance, blocking resistance and oil resistance, and further it is nontoxic.

The present invention is illustrated by the following examples, but not limited thereto. In the examples, "part" means part by weight, and the tests were carried out as follows:

1. Young's modulus and breaking elongation

The test material was melted, and made into film and allowed to cool. The test film thus produced was cut in 1 cm in width and then allowed to stand at a prescribed temperature for 5 minutes by using Tensilon (UTM-III type, made by Toyo Seiki K.K.). The load-elongation diagram was drawn at a gauge length of 1.5 cm and at a rate to pulling of 30 cm/minute, and thereby the Young's modulus $\epsilon$ (dyne/cm$^2$) and the breaking elongation $(\Delta l/lo) \times 100$ (%) were calculated.

2. Melting point

By using a micromelting point apparatus (made by Yanagimoto Seisakusho), the temperature was raised at a rate of 1°C/minute and the point was checked when it became dark viewed under a polarmicroscope.

3. Heat-seal strength of the laminated film

Tension (UTM-III type, made by Toyo Seiki K.K.) was used. The heat-sealed lamainated film was allowed to stand at a prescribed temperature for 5 minutes and then subjected to T-peel at a crosshead speed of 30 cm/minute.

EXAMPLE 1

A stainless steel reactor was charged with dimethyl terephthalate (10,000 parts), 1,4-butanediol (5,800 parts) and titanium tetrabutoxide (6 parts) and the mixture was subjected to ester exchange reaction at 140° to 230°C in nitrogen gas. The reaction mixture was added to a mixture of polytetramethylene oxide having molecular weight of 1,000 (3,800 parts) and Irganox 1010 (antioxidant, made by Ciba-Geigy; 30 parts) which was preheated at 230°C. The pressure in the reactor was gradually reduced while raising the temperature, and then the mixture was subjected to polycondensation reaction at 245°C, at reduced pressure of about 0.1 mmHg for 2 hours with agitation. The polytetramethylene terephthalate/polytetramethylene oxide block copolymer thus obtained was cooled with water and then pelletized to give a cylindrical pellet having 3 mm in diameter and 3 mm in length which was dried at 80°C, at about 0.1 mmHg for 5 hours. The reduced viscosity of the copolymer thus obtained was 1.74 dl/g, which was measured at concentration of 0.2 g/dl in phenol/tetrachloroethane: 6/4 by weight and at 30°C. The melting point thereof was 215°C.

The block copolyester was heat-pressed at 230°C, 4 kg/cm$^2$ for 30 seconds by using an iron plate coated with polytetrafluoroethylene and then allowed to cool to give a film. The dynamic properties of the film thus obtained were measured at room temperature (20°C), 130°C and 160°C.

As a base film, there was used a biaxially oriented polyethylene terephthalate film having 19 μ in thickness, and as an adhesive there was used a 15% (solid part) solution of Vylon 300 (made by Toyo Boseki K.K.)/Collonate L (made by Nippon Polyurethane K.K.): 95/5 by weight of solid part in ethyl acetate. The adhesive was applied to the base film by gravure coater (100 mesh × 40 μ), and the resultant coated film was passed through 2 m dryer at a rate of 30 m/minute, and thereon a non-oriented block copolyester film having 40 μ in thickness was laminated at nip temperature of 90° to 95°C and at nip pressure of 5 kg/cm$^2$ by dry lamination method. Two sheets of the laminated film thus obtained were put together wherein the side of nonoriented block copolyester of both films faced to each other, and then it was heat-sealed at 250°C, 2 kg/cm² for 1 second. The dynamic properties of the block copolyester resin layer are shown in Table I, and the heat-seal strength of the laminated film are shown in Table 2. For comparison, the dynamic properties and heat-seal strength of polyethylene and random copolyester which had similar melting point to that of the present block copolyester were measured. The results are also shown in Table 1 and Table 2, respectively.

COMPARATIVE EXAMPLE 1

Example 1 was repeated except that the following random copolyester was used instead of block copolyester.

The random copolyester was polyethylene terephthalate/dodecane dicarboxylate: 80/20 by molar ratio produced by a conventional ester exchange method from dimethyl terephthalate, ethylene glycol and dodecanedicarboxylic acid. It has an intrinsic viscosity of 0.695 dl/g which was measured in phenol/1,1,2,2-tetrachloroethane: 6/4 by weight at 30°C.

COMPARATIVE EXAMPLE 2

Example 1 was repeated except that a high viscosity polyethylene (Hizex No. 5600F, made by Mitsui Toatsu Chemicals Inc.) instead of block copolyester.

COMPARATIVE EXAMPLE 3

Example 1 was repeated except that a low viscosity polyethylene (Sumikasen No. F 702-2, made by Sumitomo Chemical Co., Ltd.) instead of block copolyester.

The heat-sealing of the random copolyester of Comparative Example 1 was carried out in the same manner as that of the present block copolyester. The polyethylenes of Comparative Examples 2 and 3 were heat-sealed as follows: Polyethylene was melt-extruded and laminated in the thickness of 40 μ on biaxially oriented polyethylene terephthalate film of 12 μ in thickness. Two sheets of the laminated film thus obtained were put together wherein the side of polyethylene layer of both films faced to each other, and then heat-sealed at 250°C, 2 kg/cm² for one second.

As made clear from the above results, the laminated film having the block copolyester resin layer of the present invention showed excellent heat-seal strength not only at room temperature but also at high temperature of 160°C, but on the other hand, the laminated film of Comparative Examples did not show such excellent heat-seal strength at high temperature.

EXAMPLE 2

To biaxially oriented polyethylene terephthalate film of 12 μ in thickness was applied isocyanate anchoring agent (EL 250, made by Toyo Ink K.K.; concentration: 4%) by miller roll method, and the resultant film was passed through 2m dryer wherein it was dried by hot-air of 110°C. On the coating layer the block copolyester of Example 1 was melt-extruded at resin temperature of 230°C and laminated in thickness of 40 μ at a rate of 40m/minute. The laminated film thus obtained was heat-sealed, and the heat-seal strength was measured in the same manner as described in Example 1. The heat-seal strength was 3600 g/cm at room temperature and 550 g/cm at 160°C.

EXAMPLE 3

A stainless steel reactor was charged with dimethyl terephthalate (6,200 parts), 1,4-butanediol (4,000 parts) and titanium tetrabutoxide (5.5 parts) and the mixture was subjected to ester exchange reaction at 140° to 230°C in nitrogen gas. The reaction mixture was added to a mixture of polytetramethylene oxide having a molecular weight of 1,000 (5,000 parts) and Sumilizer BHT (antioxidant, made by Sumito Chemical Co., Ltd.; 23 parts) which was preheated at 230°C. The pressure in the reactor was gradually reduced while raising the temperature, and then the mixture was subjected to polycondensation reaction at 245°C, at reduced pressure of about 0.1 mmHg for 2 hours with agitation to give polytetramethylene terephthalate/-polytetramethylene oxide block copolymer. The block copolymer thus obtained was dried at 80°C, at reduced pressure of about 0.1 mmHg for 5 hours. The reduced viscosity (νsp/C) of the copolymer was 1.99 dl/g, which was measured at a concentration of 0.2 g/dl in phenol/-tetrachloroethane: 6/4 by weight and at 30°C. The melting point thereof was 205°C.

The block copolyester was heat-pressed at 230°C, 4 kg/cm² for 30 seconds by using an iron plate coated with polytetrafluoroethylene and then allowed to cool to give a film. The dynamic properties of the film thus obtained were measured at room temperature (20°C), Table 1

| Example number of adhesive resin layer | Melting point (C°) | Young's modulus ε (dyne/cm²) | | | Breaking elongation (Δl/lo)×100 (%) | | |
|---|---|---|---|---|---|---|---|
| | | 20°C | 130°C | 160°C | 20°C | 130°C | 160°C |
| Ex. 1 | 215 | 2.0 × 10⁹ | 5.0 × 10⁸ | 4.0 × 10⁸ | 400 | 400 | 300 |
| Comp. Ex. 1 | 215 | 7.6 × 10⁸ | 3.0 × 10⁸ | 2.7 × 10⁸ | 50 | 20 | 10 |
| Comp. Ex. 2 | 132 | 2.7 × 10⁹ | 2.0 × 10⁸ | * | 200 | 100 | * |
| Comp. Ex. 3 | 110 | 3.3 × 10⁹ | * | * | 300 | * | * |

Note:
*It was impossible to measure because the material melted.

Table 2

| Example number of laminated film | Heat-seal strength (g/cm) | |
|---|---|---|
| | 20°C | 160°C |
| Example 1 | 4000 | 500 |
| Comp. Example 1 | 1000 | 50 |
| Comp. Example 2 | 2400 | 0 |
| Comp. Example 3 | 1500 | 0 |

130°C and 150°C. The results are shown in Table 3.

Table 3

| Young's modulus ε (dyne/cm²) | | | Breaking elongation (Δl/lo) × 100 (%) | | |
|---|---|---|---|---|---|
| 20°C | 130°C | 150°C | 20°C | 130°C | 150°C |
| $1.0 \times 10^9$ | $3.5 \times 10^8$ | $2.0 \times 10^8$ | 500 | 400 | 300 |

As a base film there was used a biaxially oriented polyethylene terephthalate film having 19 μ in thickness, nylon 66 film having 20 μ in thickness or polycarbonate film having 20 μ in thickness, and as an adhesive there was used a 15% (solid part) solution of Vylon 300 (made by Toyo Boseki K.K.)/Collonate L (made by Nippon Polyurethane K.K.): 95/5 by weight of solid part in ethyl acetate. The adhesive was applied to the base film by gravure coater (100 mesh × 40 μ), the resultant coated film was passed through 2 m dryer at a rate of 30 m/minute, and thereon a non-oriented block copolyester film having 40 μ in thickness was laminated at nip temperature of 90° to 95°C and at nip pressure of 5 kg/cm² by dry lamination method. Two sheets of the laminated film thus obtained were put together wherein the side of nonoriented block copolyester of both films faced to each other, and then it was heat-sealed under the following conditions:

When polyethylene terephthlate film was used as the base film:
  Temperature: 250°C, Pressure: 2 kg/cm²/second
When nylon 66 film was used as the base film:
  Temperature: 240°C, Pressure: 2 kg/cm²/second
When polycarbonate obtained from bisphenol A was used as the base film:
  Temperature: 220°C, Pressure: 2 kg/cm²/second
The results are shown in Table 4.

Table 4

| Base film | Temperature | |
|---|---|---|
| | 20°C | 150°C |
| Polyethylene terephthalate | 3000 (g/cm) | 500 (g/cm) |
| Nylon 66 | 2000 | 300 |
| Polycarbonate | 2800 | 300 |

EXAMPLE 4

A stainless steel reactor was charged with dimethyl terephthalate (6,200 parts), ethylene glycol (5,000 parts), zinc acetate (5 parts) and antimony trioxide (3 parts) and the mixture was subjected to ester exchange reaction at 140° to 230°C in nitrogen gas. The reaction mixture was added to a mixture of polytetramethylene oxide having molecular weight of 1,000 (5,000 parts) and Irganox 1010 (antioxidant, made by Ciba-Geigy; 23 parts) which was preheated at 230°C. The pressure in the reactor was gradually reduced while raising the temperature, and then the mixture was subjected to polycondensation reaction at 245°C, at reduced pres- Table 5

| Young's modulus ε (dyne/cm²) | | | Breaking elongation (Δl/lo) × 100 (%) | | |
|---|---|---|---|---|---|
| 20°C | 130°C | 150°C | 20°C | 130°C | 150°C |
| $6.0 \times 10^8$ | $2.5 \times 10^8$ | $1.0 \times 10^8$ | 600 | 400 | 300 | sure of about 0.1 mmHg for 2 hours with agitation. The reaction product was dried at 80°C, at reduced pressure of about 0.1 mmHg for 2 hours. The reduced viscosity (νsp/C) of the copolymer thus obtained was 1.59 dl/g, which was measured at concentration of 0.2 g/dl in phenol/tetrachloroethane: 6/4 by weight and at 30°C. The melting point thereof was 220°c.

The block copolyester was heat-pressed at 230°C, 4 kg/cm² for 30 seconds by using an iron plate coated with polytetrafluoroethylene and then allowed to cool to give a film. The dynamic properties of the film thus obtained were measured at 20°C, 130°C and 150°C. The results are shown in Table 5.

As a base film there was used a biaxially oriented polyethylene terephthalate film having 19 μ in thickness, and as an adhesive there was used a 15% (solid part) solution of Vylon 300 (made by Toyo Boseki K.K.)/Collonate L (made by Nippon Polyurethane K.K.): 95/5 by weight of solid part in ethyl acetate. The adhesive was applied to the base film by gravure coater (100 mesh × 40 μ), the resultant coated film was passed through 2 m dryer at a rate of 30 m/minute, and thereon a non-oriented block copolyester film having 40 μ in thickness was laminated at nip temperature of 90° to 95°C and at nip pressure of 5 kg/cm² by dry lamination method. Two sheets of the laminated film thus obtained were put together wherein the side of non-oriented block copolyester of both films faced to each other, and then it was heat-sealed at 250°C, 2 kg/cm² for one second. The heat-seal strength of the film was 2,800 g/cm at room temperature and 200 g/cm at 150°C.

EXAMPLE 5

A stainless steel reactor was charged with dimethyl terephthalate (6,000 parts), dimethyl isophthalate (2,000 parts), 1,4-butanediol (4,600 parts) and titanium tetrabutoxide (4.5 parts) and the mixture was subjected to ester exchange reaction at 140° to 230°C in nitrogen gas. The reaction mixture was added to a mixture of polytetramethylene oxide having molecular weight of 1,000 (3,000 parts) and Irganox 1010 (antioxidant, made by Ciba Geigy; 24 parts) which was preheated at 230°C. The pressure in the reactor was gradually reduced with rising the temperature, and then the mixture was subjected to polycondensation reaction at 245°C, at reduced pressure of about 0.1 mmHg for 2 hours with agitation to give polytetramethylene terephthalate·isophthalate/polytetramethylene oxide block copolymer. The reaction product was dried at 80°C, at reduced pressure of about 0.1 mmHg for 2 hours. The reduced viscosity ($\mu$sp/C) of the copolymer thus obtained was 1.70 dl/g, which was measured at concentration of 0.2 g/dl in phenol/tetrachloroethane: 6/4 by weight and at 30°C. The melting point thereof was 185°C.

The block copolyester was heat-pressed at 230°C, 4 kg/cm² for 30 seconds by using an iron plate coated with polytetrafluoroethylene and then allowed to cool to give a film. The dynamic properties of the film thus obtained were measured at room temperature, 130°C and 160°C. The results are shown in Table 6.

Table 6

| Young's modulus $\epsilon$ (dyne/cm²) | | | Breaking elongation $(\Delta l/lo) \times 100$ (%) | | |
|---|---|---|---|---|---|
| 20°C | 130°C | 160°C | 20°C | 130°C | 160°C |
| $2.0 \times 10^8$ | $3.0 \times 10^8$ | $4.0 \times 10^7$ | 600 | 300 | 200 |

As a base film there was used a biaxially oriented polyethylene terephthalate film having 19 $\mu$ in thickness, and as an adhesive there was used a 15% (solid part) solution of Vylon 300 (made by Toyo Boseki K.K.)/Collonate L (made by Nippon Polyurethane K.K.): 95/5 by weight in ethyl acetate. The adhesive was applied to the base film by gravure coater (100 mesh × 40 $\mu$), the resultant coated film was passed through 2 m dryer at a rate of 30 m/minute, and thereon a non-oriented block copolyester film having 40 $\mu$ in thickness was laminated at nip temperature of 90° to 95°C and at nip pressure of 5 kg/cm² by dry lamination method. Two sheets of the laminated film thus obtained were put together wherein the side of non-oriented block copolyester of both films faced to each other, and then it was heat-sealed at 250°C, 2 kg/cm² for one second. The heat-seal strength of the film was 3,400 g/cm at room temperature and 200 g/cm at 160°C.

EXAMPLE 6

The block copolyester produced by Example 1 was melt-extruded and laminated on a copper foil having 35 $\mu$ in thickness treated by electrolysis in the thickness of 50 $\mu$ at resin temperature of 235°C and at a rate of 40 m/minute. Two sheets of the laminated film thus obtained were put together wherein the side of the resin of both films faced to each other, and then it was heat-sealed at 250°C, 4 kg/cm² for one second. The heat-seal strength of the film was 3,500 g/cm at room temperature (20°C) and 1,200 g/cm at 160°C.

EXAMPLE 7

On both sides of biaxially oriented polyethylene terephthalate film having 19 $\mu$ in thickness was laminated, the non-oriented block copolyester having 30 $\mu$ produced in Example 1 in the same manner as described in Example 1 by using the same adhesive as in Example 1 to give a three-layered laminated film comprising non-oriented block copolyester film (30 $\mu$ in thickness), biaxially oriented polyethylene terephthalate film (19 $\mu$ in thickness) and non-oriented block copolyester film (30 $\mu$ in thickness). Two sheets of the film thus obtained were put together and then heat-sealed at 250°C, 4 kg/cm² for one second. The heat-seal strength of the film was 3,200 g/cm at room temperature (20°C) and 350 g/cm at 160°C.

What is claimed is:

1. A heat-adhesive laminated film comprising (1) a base film selected from the group consisting of (a) a plastic film made from a polyester, polyamide or polycarbonate which is in a form of non-oriented film, uniaxially oriented film or biaxially oriented film and (b) a metal foil made from aluminum or copper and (2) a film of a resin comprising predominantly block copolyester selected from the group consisting of polyethylene terephthalate/polytetramethylene oxide block copolymer, polytetramethylene terephthalate/polytetramethylene oxide block copolymer, polyethylene terephthalate isophthalate/polytetramethylene oxide block copolymer and polytetramethylene terephthalate·isophthalate/polyeteramethylene oxide block copolymer, which has a melting point of (a) greater than 180°C but at least 20°C. lower than the melting point of the plastic film if the base film (1) is a plastic film or (b) greater than 180°C. but no more than about 300°C. if the base film (1) is a metal foil, and which has a Young's modulus ($\epsilon$) and a breaking elongation ($\Delta l/lo \times 100$) when measured at 20°C. and 130°C. of $10^7$ dyne/cm² $< \epsilon < 10^{10}$ dyne/cm² and
$(\Delta l/lo) \times 100 > 40\%$ said film of a resin (2) being laminated on at least a single side of said base film (1).

2. The heat-adhesive laminated film according to claim 1, wherein the block copolyester (2) comprises (i) a crystalline polyester segment consisting of polyethylene terephthalate unit, polytetramethylene terephthalate unit, polyethylene terephthalate·isophthalate unit or polytetramethylene terephthalate·isophthalate unit, said crystalline polyester segment having a melting point of at least 200°C when a polymer having fiber-forming properties is produced by the monomer composing the unit alone and having a molecular weight of 400 to 10,000, and (ii) a polymer segment consisting of polytetramethylene oxide and having a molecular weight of 400 to 6,000, said polymer segment (ii) being included in a ratio of 5 to 80% by weight in the block copolyester.

3. The heat adhesive laminated film according to claim 2 in which the base film (1) is a plastic film made from a polyester, polyamide or polycarbonate.

4. The heat-adhesive laminated film according to claim 2, wherein the crystalline polyester segment consists of polyethylene tetephthalate·isophthalate unit or polytetramethylene terephthalate·isophthalate unit and includes 70 or more % by weight of ethylene terephthalate unit or tetramethylene terephthalate unit.

5. The heat-adhesive laminated film according to claim 2, wherein the polymer segment consisting of polytetramethylene oxide and having a molecular weight of 400 to 6,000 is included in a range of 20 to 50% by weight in the block copolyester.

6. The heat-adhesive laminated film according to claim 1, wherein the laminated film comprises a base film having a thickness of 10 to 500 $\mu$ and a block copolyester film having a thickness of 30 to 500 $\mu$.

7. The heat-adhesive laminated film according to claim 6, wherein the laminated film comprises a base film having a thickness of 10 to 30 $\mu$ and a block copolyester film having a thickness of 30 to 100 $\mu$.

8. The heat-adhesive laminated film according to claim 1, wherein the base film is polyethylene terephthalate film having a thickness of 10 to 30 $\mu$ and the film of resin is a film having a thickness of 30 to 70 $\mu$ made from polytetramethylene terephthalate/polytetramethylene oxide block copolymer containing 20 to 50% by weight of polytetramethylene oxide having a molecular weight of 400 to 3,000.

9. The heat-adhesive laminated film according to claim 1, wherein the base film is polyethylene terephthalate film having a thickness of 10 to 30 $\mu$ and the film of resin is a film having a thickness of 30 to 70 $\mu$ made from polytetramethylene terephthalate isophthalate/polytetramethylene oxide block copolymer containing 20 to 50% by weight of polytetramethylene oxide having a molecular weight of 400 to 3,000.

10. The heat-adhesive laminated film according to claim 1, wherein the laminated film comprises a base film consisting of a plastic film made from a polyester, polyamide or polycarbonate or a metal foil made from aluminum or copper having a thickness of 10 to 30 $\mu$ and a block copolyester film having a thickness of 30 to 70 $\mu$ made from polytetramethylene terephthalate/polytetramethylene oxide block copolymer containing 20 to 50% by weight of polytetramethylene oxide having a molecular weight of 400 to 3,000.

11. The heat-adhesive laminated film according to claim 1, wherein the laminated film comprises a base film consisting of a plastic film made from a polyester, polyamide or polycarbonate or a metal foil made from aluminum or copper having a thickness of 10 to 30 $\mu$ and a block copolyester film having a thickness of 30 to 70 $\mu$ made from polytetramethylene terephthalate isophthalate.polytetramethylene oxide block copolymer containing 20 to 50% by weight of polytetramethylene oxide having a molecular weight of 400 to 3,000.

* * * * *